March 14, 1972 V. PRETORIUS ET AL 3,649,498

DETECTION IN CHROMATOGRAPHY

Filed Aug. 2, 1967 3 Sheets-Sheet 1

INVENTORS
VICTOR PRETORIUS
HANS HELMUT HAHN

BY I. William Millen

INVENTORS
VICTOR PRETORIUS
HANS HELMUT HAHN
BY I. William Miller

INVENTORS
VICTOR PRETORIUS
HANS HELMUT HAHN
BY I. William Miller

United States Patent Office 3,649,498
Patented Mar. 14, 1972

3,649,498

DETECTION IN CHROMATOGRAPHY

Victor Pretorius, "Klein Waterkloof," Club Ave., Waterkloof, Pretoria, Republic of South Africa, and Hans Helmut Hahn, 38 Marais St., Bailey's Muckleneuk, Pretoria, Republic of South Africa Continuation-in-part of application Ser. No. 583,788, Oct. 3, 1966. This application Aug. 2, 1967, Ser. No. 657,804
Claims priority, application Republic of South Africa, Aug. 8, 1966, 66/4,568
Int. Cl. B01k 5/00, 3/00
U.S. Cl. 204—180 G 8 Claims

ABSTRACT OF THE DISCLOSURE

The progress of a chromatographic separation is monitored at any desired locality of the chromatographic system by observing at a solid detection electrode with reference to a reference electrode any detectable constitution and concentration dependent electrical quantity, e.g. conductivity, electrolytic current, capacitance, zeta-phenomena or a combination of superimposed quantities.

CROSS REFERENCES TO PENDING RELATED APPLICATIONS

This is a continuation-in-part of Ser. No. 583,788 filed Oct. 3, 1966.

Also pertinent is the disclosure of application Ser. No. 548,900 filed May 10, 1966, now Patent No. 3,493,497 and that of the following applications being filed at approximately the same time as the present application: "Chromatic Separation" and "Method and Apparatus for the Introduction of Samples Into Chromatographic Separating Systems."

BACKGROUND OF THE INVENTION

The present invention relates to improvements in detection in chromatography for the purpose of monitoring the progress of a chromatogram in a chromatographic system at a predetermined locality.

Various detecting methods and means are known in chromatography, and for the purposes of the present invention only some of the more sophisticated earlier proposals are relevant and primarily those relating to liquid chromatography.

Of these methods differential refractometry is expensive and insensitive. Heat absorption and desorption is also expensive, relatively insensitive and results in double peaks which is inconvenient. Spectrometric detection is insensitive and again very expensive. Recently an ultrasonic method has been proposed which is bound to be expensive, its other practical limitations being as yet unknown. Finally a dropping mercury electrode method may be mentioned which has been proposed but which is inherently inconvenient to employ, suffers from large time constants and involves large dead volumes in the equipment.

The invention, although not to be limited by the following, is in principle capable of the attainment of a number of important advantages. Extremely high sensitivities are attainable. Although it is possible to elaborate on the equipment where such is desired, the basic equipment is simple and can be made at low cost. The method and means are exceptionally versatile, being capable of responding to a vast variety of solutes in practically all solvents normally employed in liquid chromatography. Whilst the invention is not limited to micro-chromatography it lends itself excellently to that purpose because it can do with exceptionally small dead volumes. In a very large number of applications, notably in ionised systems, the responsiveness is very fast rendering the invention suitable for use in modern high speed separations. In view of the above, one object attainable with the present invention is to render the plate height contribution due to the detector negligibly small by comparison with the total plate height of the chromatographic system.

A further object of the invention is the provision of a detection method and apparatus in the context of chromatography applicable to an unusual variety of chromatographic systems and in which a variety of effects may be relied upon at the option of the operator, literally or substantially by the flick of a switch.

SUMMARY OF THE INVENTION

In accordance with the present invention, the method as outlined above comprises passing a moving phase of the system in contact with a solid detection electrode at said locality and observing a constitution and concentration dependent electrical quantity detectable at said detection electrode with reference to a reference electrode connected to the system.

The method may be carried out by maintaining an electrical potential across said electrodes controlled to a value adapted for an electrolytic oxidation/reduction change to take place of the substance in said fluid, the presence and concentration of which is being monitored, and measuring the relationship between at least two members of the group of quantities interrelated by Ohm's law, i.e. of current, potential and resistance, whilst the fluid passes in contact with the electrodes.

In a large number of cases the observed signals are ascribable at least in part to phenomena substantially similar to those known from polarography. However, oxidation-reduction phenomena have now been utilised successfully to monitor solutes which under the given conditions undergo no electrolytic change themselves but which, in accordance with their presence or absence and their concentration influence in a measurable manner the electrolytic oxidation-reduction reaction of an independent indicator substance also present in the eluate.

A suitable indicator substance is oxygen dissolved in the forwarding phase (eluent), and in such cases the eluent is preferably equilibrated with atmospheric oxygen under repeatable conditions.

However, it has now been found that it is not necessary for a successful detection to rely entirely on oxidation-reduction reactions either of the solutes themselves or on oxidation-reduction phenomena at all. Some readings taken were inexplicable on that basis, showing quite generally that the data observed can be the result of a variety of phenomena which may even be superimposed, not all of which have yet been explained satisfactorily, but which all give rise to a detectable signal useful for monitoring the progress of the chromatogram and satisfying the particularly stringent requirements of chromatography.

In many cases it has been established that the progress of the chromatogram is monitored on the basis of changes in the electrical double layer of the detection electrode.

In some cases it has been possible to identify the changes in the electrical double layer on the detection electrode as being produced substantially by the zeta effect. When a liquid is in contact with a surface, e.g. the solid wall of a tube, it is found that a so-called zeta potential arises across the interface. Any flow of the liquid relative to the surface will be result in the development of a streaming potential between opposite ends of the interface, e.g. between opposite ends of a tube through which the liquid is forced. The potential increases with flow velocity and is very sensitive to the composition of the liquid, both with regard to ingredients and their concentrations. In accordance with the present invention it is now possible to use this phenomenon as well for a highly sensitive method and apparatus for detection either alone or incombination with other phenomena. It is possible to measure either the streaming potential or the resulting current.

The streaming potential may also be measured between two ends of a porous plug, e.g. opposite ends of a section of chromatographic column packing.

Yet a further electrical quantity which may be used to monitor the progress of the chromatographic separation is the capacity existing between the electrodes as a function of the dielectric properties of the system at the locality of monitoring. These again are decidedly constitution and concentration dependent. The capacity measurements may be taken in a manner known per se, e.g. with a heterodyne beat bridge.

Still a further electrical quantity available for the purposes of the invention is conductivity. The conductivity may be monitored directly in any manner known per se. In certain cases it is possible, however, to do so indirectly by observing another effect which in turn is conductivity dependent. For example, wherein the above the use of an indicator substance has been mentioned it was found in some cases that the oxidation-reduction reaction observed was in fact controlled by the conductivity of the eluate which in turn was controlled by the solutes present.

The method is not confined to monitoring the eluate as it emerges from a chromatographic separation process but can be usefully employed to monitor in general the progress of a chromatogram at any desired locality in the chromatographic system, namely also at a locality intermediate between the locality of introduction of substance to be separated and the locality of withdrawal of separated substance. It then becomes possible, for example, to determine when any corrective action is necessary or to determine the right time for a change in the composition of the forwarding phase or of any other parameter.

In principle the invention could also be usefully employed at various localities in a system for continuous chromatographic separation where a variation in the signal will normally be indicative of some form of disturbance requiring corrective action for the restoration of normal process conditions.

The invention offers particular and surprising advantages in the field of chromatography because of the unexpectedly high sensitivities obtained in an unusual variety of chromatographic systems, the ease with which the detector cells can be miniaturised for negligible plate height contributions due to the detector system and the very rapid response to changes in the eluate.

The invention is at present considered to find its widest application in liquid chromatography which will therefore be emphasised in the following description. Yet it is considered that the method may also be adapted to following the progress of a gas chromatographic separation process. In some cases it may be possible to measure concentration or constitutional changes in the gases direct. In most cases it will be necessary to carry out the method in the presence of a liquid, preferably an electrolyte, e.g. a film of liquid applied to the electrodes. For example, a film of liquid, e.g. water, may be caused to run over the electrodes continuously, more particularly at a constant rate.

Alternatively, the gaseous eluate may be caused to bubble through a cell filled with liquid. For this purpose an electrode similar in construction to a gas electrode may be employed.

It is also possible to pass the eluate cocurrently with a constant continuous stream of liquid through the detector cell.

The liquid may include a solubilizing agent for the components of the gas the concentration of which is to be monitored, e.g. a substance or substances capable of forming soluble complexes or salts with such components.

Also in the following description, the application of the invention to elution chromatography carried out in columns will be emphasized, although the invention is not to be considered limited thereby in any way.

The invention is applicable in principle also to paper chromatography in which case the paper may be placed in contact with, e.g. clamped between two thin edged electrodes or in which the paper may be marked with conductive lines, e.g. of graphite to serve as the electrodes. Detection electrodes may also be incorporated in the plates used in thin layer chromatography.

The invention may also be applied to starch or gel (agar) chromatography (electrophoresis).

The invention also includes in its scope any apparatus for monitoring the progress of a chromatogram in a chromatographic system at a predetermined locality, which comprises: a solid detection electrode in the path of flow of a moving phase of the chromatographic system, forming a pair with a reference electrode also in said path of flow and a means for observing a constitution and concentration dependent electrical quantity detectable at said detection electrode with reference to said reference electrode.

Such apparatus in accordance with more specific embodiments may comprise separately or in combination:

(a) Means for controlling the potential across the electrodes and means for measuring the relationship between at least two members of the group of quantities interrelated by Ohm's law, i.e. of current, potential and resistance, and terminals adapted to be connected to a source of electric power for maintaining said potential;

(b) Conductivity observing means associated with said electrodes;

(c) Means responsive to a change in the electrical double layer on said electrodes associated with the electrodes;

(d) Electrical capacity measuring means associated with said electrodes;

(e) The feature that said electrodes and means for observing are responsive to electrical quantities arising out of the zeta effect; and further details described in the specific examples.

Preferably the apparatus comprises a plurality of said means for observing, responsive to different electrical quantities and selecting switch means for connecting a selected observing means to the electrodes. It may further comprise a plurality of detection electrodes at said locality, the electrodes having different characteristics and being interchangeably connectable to the observing means via selecting switches.

The scope of the invention includes chromatographic separations carried out in combination with the detection method herein described and complete chromatographic apparatus including the features of the apparatus for monitoring.

BRIEF DESCRIPTION OF THE DRAWINGS

Further aspects and details of the invention will be described in the following, largely by way of example, with reference to the accompanying drawings, in which:

FIG. 24 represents a further typical chromatogram recorded in accordances with the invention.

DESCRIPTION OF THE PREFERRED EMBODIMENTS

Figures 1, 2, 3, 4, 5, 6, 7, 8, 9, 10, 11, 12:
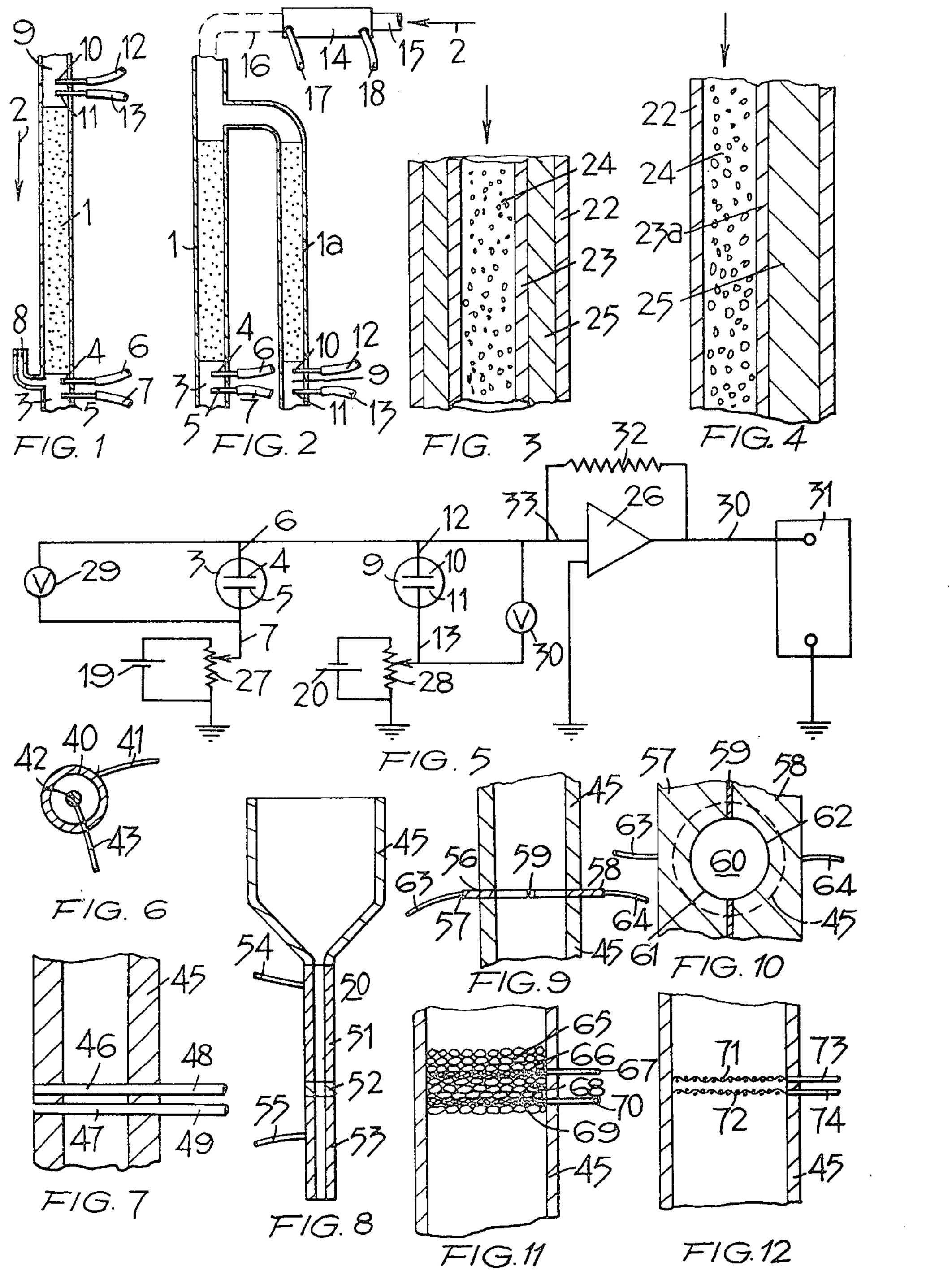
FIG. 1 represents a chromatographic column including the detection means in accordance with the invention.
FIG. 2 represents a view similar to FIG. 1 in an alternative arrangement and including eluent cleaning means.
FIGS. 3 and 4 represent two embodiments of an eluent purifying device in broken away section for use in combination with the detection means in accordance with the invention.
FIG. 5 represents a wiring diagram of a preferred embodiment in accordance with the invention.
FIG. 6 represents a section transverse to the direction of flow through a detection cell in accordance with the invention.
FIGS. 7 to 9, 11 and 12 represent sections of different embodiments of detection cells in accordance with the invention taken parallel to the direction of flow.
FIG. 10 represents a section transverse to the section in accordance with FIG. 9.

Referring to FIG. 1 a chromatographic column is represented by 1, the direction of flow being indicated by arrow 2. In accordance with the invention a detection cell 3 is provided at the outlet side of the column, having two electrodes 4 and 5 with terminals 6 and 7. Various constructions of cells will be described further below. When, for example, a suitable potential is applied across terminals 6 and 7 electrochemical oxidation or reduction will take place of any suitable solute contained in the eluate from the chromatographic column substantially in accordance with the principles of polarography and electrochemistry. The concentration of any supporting electrolyte, if used, is usually chosen to be at least 10 to 100 times the concentration of the solute being monitored. For example, where the solute has a concentration of $10^{-7}$ to $10^{-8}$ molar the corresponding concentration of supporting electrolytes will be $10^{-5}$ to $10^{-6}$ M. Typical supporting electrolytes are inorganic salts such as potassium chloride or lithium nitrite or organic salts such as tetraethyl or methyl ammonium halide, e.g. chloride, bromide or iodide. In the low concentrations in which the supporting electrolyte is usually employed it is sufficiently soluble in virtually all typical solvents employed as chromatographic eluents including aromatic hydrocarbon solvents such as benzene and toluene; pyridine; ether; lower alcohols such as ethanol or methanol; carbon tetrachloride, chloroform; aliphatic hydrocarbons such as pentane, hexane, heptane or octane; dioxane and others. Where the solubility for the supporting electrolyte is inadequate and also in order to ensure ionisation slight moistening of the solvent with water may be resorted to.

In the majority of cases, the supporting electrolyte may be incorporated in the eluent before it enters the chromatographic column or equivalent chromatographic separating device. However, for cases in which such is not desired, the invention provides for an inlet 8 between the end of column 1 and the detector cell 3 through which inlet supporting electrolyte solution may be introduced into the eluate. Inlet 8 may, however, also be employed to introduce continuously an indicator substance which is selected to undergo a detectable oxidation-reduction reaction depending on the presence of the solutes being monitored but which themselves do not undergo any change.

Substantially the same arrangement may also be employed for conductivity observations.

At present the potential sensitivity of the method and apparatus is estimated to be in the vicinity of $10^{-14}$ mole per litre. The limiting factor at present is mainly electric noise in the system, the noise level in a single detecting cell being of the order of $10^{-9}$ ampere. A substantial part of this noise may be eliminated by coupling the detector cell 3 to a compensating cell 9 having electrodes 10 and 11 with terminals 12 and 13 respectively and being substantially similar to cell 3. Two potential manners of coupling in the system are envisaged. In FIG. 1 the compensating cell precedes the inlet end of column 1. In that manner the compensating cell is subject to substantially the same fluctuations in flow velocity and associated sources of electric noise as the detector cell 3.

Another arrangement is shown in FIG. 2 in which a dummy column **1*a* is provided having substantially similar flow characteristics to the separating column 1 and in which the compensating cell occupies a position equivalent to the position of cell 3 relative to column 1**.

FIG. 2 also illustrates the installation of an eluent purifying device 14 having an inlet end 15 and an outlet end 16 connected to the inlet end of columns 1, **1*a* and terminals 17 and 18. Across the terminals a predetermined potential is applied, e.g. tapped off from a potentiometer designed to remove all impurities which might interfere with the chromatogram or the readings taken from detector 3**. In addition, when necessary, the eluent even before it enters the purifying device is first freed of oxygen in a manner known pe se, e.g. by bubbling nitrogen through the eluent.

One embodiment of the purifier is illustrated in FIG. 3 comprising a tubular outside wall 22, in concentrical relationship thereto a porous sinterglass tube 23 containing an electrically conductive liquid pervious packing, e.g. tin shot, glassy carbon powder, silver plated plastic foam, in electrical contact with one of the terminals 17, 18 in FIG. 2 and a reference electrode, of which the electrode material, e.g. calomel or silver chloride fills space 25. The reference electrode is connected to the other terminal 17, 18. The porous tube 23 is impregnated with agar, saturated with an electrolyte compatible with the reference electrode.

The embodiment in accordance with FIG. 4 differs from that in accordance with FIG. 3 by the substitution for porous tube 23 of a porous partition **23*a*, similarly impregnated with electrolyte saturated agar, and dividing the tube 22 into two parallel passages, one containing the reference electrode, the other conductive packing 24**. A suitable partition may be made out of the porous plates (e.g. sintered synthetic resin) employed in accumulators as electrode spacers.

Referring now to FIG. 5 the terminal 7 of cell 3 is used to tap off the desired potential of a potentiometer 27 connected across a battery 19 which voltage is measured with a volt meter 29. Similarly terminal 13 is fed with the desired voltage for compensating cell 9 from potentiometer 28 connected across a battery 29. The voltage tapped off is measured with volt meter 30. Potentiometers 27 and 28 each have one terminal earthed. Terminals 6 and 12 of cells 3 and 9 are connected to one input terminal of an operational amplifier 26, the other input terminal of which is earthed. A suitable operational amplifier is, for example, the commercial model Philbrick P 65 AU (Philbrick Associates Boston, Mass.). The output terminal 30 of the amplifier is connected to one input terminal of a recorder 31, the other terminal of which is earthed. A feedback resistance, 32, e.g. 10K is connected across from the input terminal 33 of the operational amplifier to the output terminal 30. The cells 3 and 9 are so coupled that the differential current of the two cell is recorded.

The distance between the two cells 3 and 9 in the chromatographic system must not be less than a certain minimum which depends on the conductivity of the system and the eluent in particular. The total resistance between the two cells must be high enough not to affect appreciably the measured current. For example, where the detection current is $10^{-8}$ ampere with an applied voltage of 2 volts, the resistance must be such that the internal current is not more than about one tenth the measured current. Therefore, the internal resistance between the cells should be about $10^9$ ohms at least. The internal resistance depends, of course, on the geometry of the system and the electrolyte concentration. If the column packing itself does not contribute to the conductivity and assuming a typical KCl concentration of $10^{-3}$ M. the minimum distance between the cells will be 50 centimeters for a column diameter of 3 mm.

It will be realised, of course, that the provision of compensating cell 9 is a refinement which in some cases may be dispensed with. Moreover, in accordance with the disclosure of our pending application Ser. No. 657,814 filed Aug. 2, 1967 entitled "Method and Apparatus for the Introduction of Samples Into Chromatographic Systems" the compensating cell, when provided in the inlet end of the apparatus may simultaneously serve as a sample introduction device.

Referring now to FIG. 6 the detector cell shown is tubular, the walls 40 of the tube being of a suitable conductive material with a terminal 41 connected thereto, adapted to act as one of the electrodes. The other electrode 42 with terminal 43 takes the form of a wire concentrically arranged relative to the cell walls.

In the selection of the design of a cell for a particular chromatographic system, the cell's contribution to the total plate height is an important consideration. The total plate height is composed of plate height contributions derived from the separating system itself, the inlet, the outlet and the detection cell. According to very recent developments plate heights of the order of as little as $10^{-3}$ cms. are feasible in micro analytical systems and accordingly it is to be endeavoured for the contribution to plate height of the detector cell not to exceed this order of magnitude. In the following will be shown how this may be achieved with various cell constructions.

Referring to FIG. 7, the column wall is shown as 45. The detector cell forms a direct continuation of the packed portion of the column (packing not shown). The detector electrode 46 is represented by a thin rod or wire projecting across the inside of the column. In order to achieve the desired low plate height contribution its thickness is chosen to be of the order of $10^{-3}$ cms. The dimensions of the reference electrode 47, which could be of similar construction, are not as critical. However, the two electrodes should be as closely together as possible to keep the internal resistance to an absolute minimum for maximum sensitivity of the cell. It will be realized that as a result the terminals 48 and 49 also come to be very close together creating some potential insulation problems. Fluorinated hydrocarbon polymer such as polychlorotrifluoroethylene or polytetrafluoroethylene have been found satisfactory insulators for the purpose.

Referring now to FIG. 8, the column walls proper are again indicated as 45 tapering towards a much narrower portion 50 representing the detector cell. This narrow portion consists of a conductive capillary 51 followed by a very short insulating capillary 52 which in turn is followed by a second conductive piece of capillary 53. Capillary 51 with its terminal 54 serves as the detector electrode and capillary 53 serves as the reference electrode, being provided with a terminal 55. The length of the reference electrode is not critical. The length of insulating portion 52 is again chosen as short as possible, whilst the length in terms of cm. of the capillary 51 is so selected that it does not exceed $10^{-3}$ times the ratio of the square of the column diameter to the square of the capillary inner diameter, in order to satisfy the requirement of a small contribution to total plate height. For example, for a column diameter of 2 mm. and a capillary diameter of 0.2 mm., the length of the detector electrode will be 1 mm.

Referring to FIGS. 9 and 10 the outlet end of column 45 has been neatly cut across at 56 and reassembled e.g. with a synthetic resin adhesive such as epoxy resin after insertion between the two pipe ends of a composite disc composed of two conductive half-discs 57 and 58 joined end to end by an intermediate strip of insulating material 59. After completion of the assembly a hole 60 is drilled through the composite disc to restore a continuous tubular passage, part of the walls of which is formed by the exposed edges 61 and 62 of the half-discs 57 and 58. Each half-disc is provided with a terminal 63 and 64 respectively to complete the cell in which half-discs 57 and 58 now perform the functions of the detector and reference electrode respectively. The preferred thickness of disc 57, 58 is once again $10^{-3}$ cms.

Referring now to FIG. 11, yet another manner of providing a detector cell is to render parts of the column packing conductive. Thus the main column packing 65 is non-conductive followed by a thin layer 66 of conductive particles in contact with a terminal 67, this in turn being followed by a thin layer 68 of non-conductive packing, followed in turn by a layer 69 of conductive packing in contact with a terminal 70 and representing the reference electrode. The particles have, for example, a diameter of $10^{-3}$ cms. This embodiment is very suitable also for providing monitoring means inside a chromatographic separating system as well, and not necessarily only at the inlet or outlet ends thereof.

Referring to FIG. 12, the detector and reference electrodes are represented by two parallel closely spaced very fine wire gauze grids 71, 72 spanned across the inside of column walls 45, each having terminals 73 and 74 respectively. The spacing of the wire gauze grids depends on the internal resistance and may for example be of the order of between 0.1 and 3 mm.

The electrodes may be made of any material (or materials) which is conducting and does not interfere with the measurement of the data being monitored, e.g. conductivity or the current resulting from an oxidation/reduction process. Examples of electrode materials are platinum, copper, gold, nickel, graphite, including pyrolised graphite.

If the discharge of hydrogen and oxygen is to be suppressed, e.g. in aqueous solutions, an electrode material showing large overvoltages for such reactions is useful, e.g. copper. In some cases amalgamated platinum may be used, particularly for the anode. A particularly advantageous electrode material suitable for both the anode and the cathode has been found to be glassy carbon.

Regarding the reference electrode numerous further variations are possible, for example the employment of a standard calomel or silver chloride electrode, as will be described further below with reference to FIG. 15.

Where a layer of conductive particles is employed as an electrode as in FIG. 11, such particles may, for example, consist of or comprise metal powders or carbon powders, in particular graphite powders, glassy carbon or powders of synthetic or natural resins containing a conductive filler, e.g. metal or graphite.

Figures 13, 14:
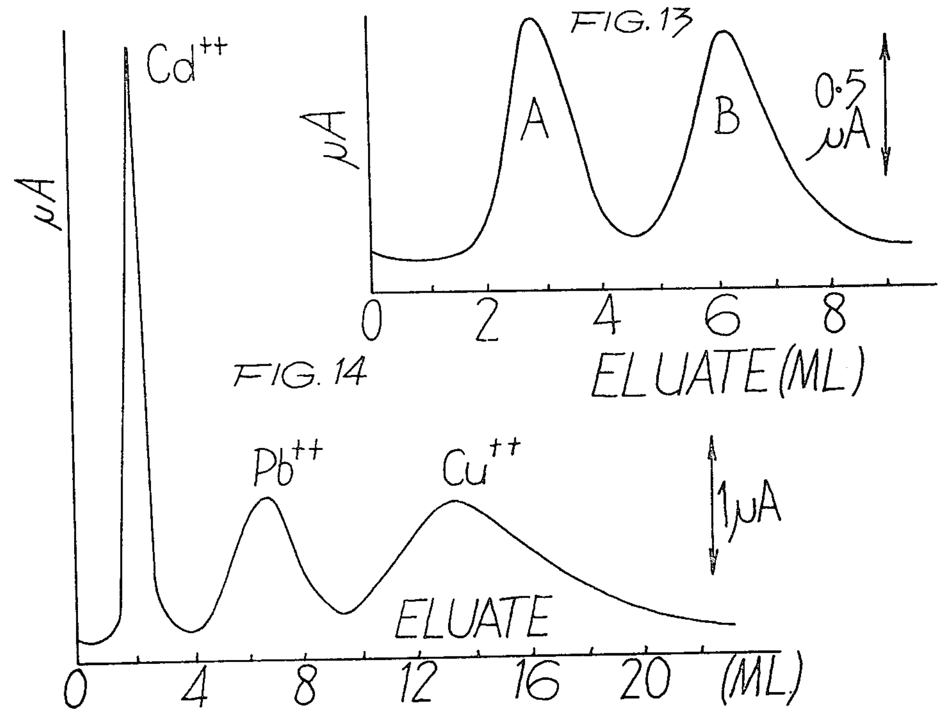
FIGS. 13 and 14 represent two typical chromatograms recorded by the method in accordance with the invention.

FIG. 13 represents a typical chromatogram recorded on an automatic recorder connected to a detector cell in accordance with the invention. It represents the separation of Acid Bordeaux and F.C.F. Brilliant Blue on Silica Gel H; Eluting Agent: 6% Ethanol and $4\times10^{-3}$ M KCl; Detection by Cu (Cathodic)—and Pt (Anodic)—Electrodes; Appl. Pot.=1.8 v. Column 10 cm. long x 5 mm. internal diameter. Each substance was employed in an amount of $2\times10^{-8}$ mols. Peak A represents acid Bordeaux and peak B F.C.F. Brilliant Blue.

FIG. 14 illustrates a similar chromatogram of $Cd^{++}$, $10^{-7}$ mols $Pb^{++}$ $8\times10^{-8}$ mols and $Cu^{++}$ $2\times10^{-7}$ mols on Amberlite I.R. 120. Elutating Agent: 1.0 M KCl (pH 5). Detection by Pt (Hg)-Amalgam (Cathodic)-Graphite (Anodic). Appl. Pot.=1.9 v. Column 8 cm. x 4 mm. 10 $\mu$l. sample.

Both afore-described chromatograms took approximately 10 minutes to complete.

Figure 15:
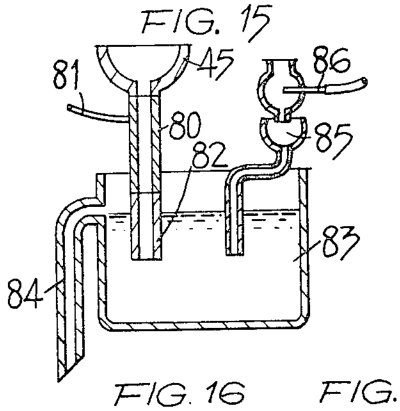
FIG. 15 represents yet another vertical section through another embodiment of a detection cell in accordance with the invention.

FIG. 15 illustrates an alternative method of putting the invention into practice. The column 45 has a capillary outlet of which the top portion 80 is conductive, connected to a terminal 81 and serves as the detector electrode followed by a piece of insulating capillary 82, which latter dips into an open-topped vessel 83 having an overflow 84, whilst the reference electrode is formed by a calomel electrode 85 with a terminal 86, also dipping into vessel 83.

Figure 16:
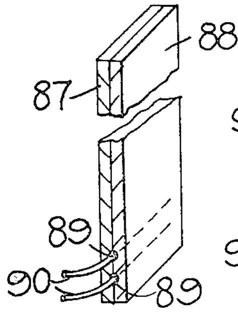
FIG. 16 represents a thin layer chromatographic plate for thin layer chromatography modified in accordance with the invention.

The invention is also applicable to thin layer chromatography as shown in FIG. 16, illustrating a chromatographic plate having a base 87 with a conventional chromatographic thin layer 88 applied thereto. Near one end of the plate two fine grooves 89 have been cut or etched into the base 87 to accommodate each a fine line of conductive material, e.g. a metal wire, each having a terminal 90, the two wires serving as the detector and the reference electrode respectively.

Figure 17:
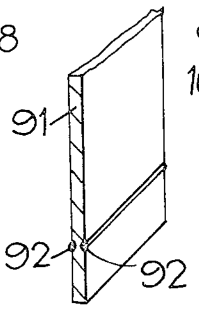
FIG. 17 represents an edge on view of a strip of chromatographic paper modified in accordance with the invention.

This arrangement is very similar to that in accordance with FIG. 17, where a strip of chromatographic paper 91 is shown having to each side thereof applied a fine line of conductive material, e.g. graphite, transverse to the direction of development when the paper is used in chromatography. The paper will, in use, be clamped, e.g. near the edge, between two terminals, each in contact with one of the lines 92.

Where the internal resistance of the system is very high, e.g. where the solvent is substantially non-polar (e.g. benzene) with but a trace of electrolyte if necessary, the same electronics may be employed for the detectors as for a conventional flame detector as used in gas chromatography.

In some cases, the method may be further improved by passing the eluate between the electrodes under turbulent conditions, thereby to decrease the diffusion layer and increase sensitivity. This may be achieved by the maintenance of high flow rate, and/or by adapting the cross-section of the cell to induce turbulence. Electrodes may also be employed specifically shaped to induce turbulence.

The electrodes or the entire cell may be subjected to oscillation, e.g. ultrasonic vibrations for the same purpose.

The methd is particularly suitable for use with chromatographic processes in which the separation itself takes place under turbulent conditions of the moving phase as described in our pending application Ser. No. 548,900 filed May 10, 1966, now Patent No. 3,493,497.

The process may also be applied to the monitoring of continuous chromatographic processes in order to observe the maintenance of separating efficiency.

In all cases it is possible to employ several pairs of electrodes in succession, e.g. maintained at different potentials for the simultaneous measurements of the concentrations of different substances.

The method when carried out to monitor on the basis of oxidation-reduction phenomena may be carried out with direct current. The voltage setting across the electrodes may be employed to provide qualitative information concerning the nature of the substance the concentration of which is being monitored.

If desired or required, the polarity of the electrodes may be reversed from time to time in order to prevent the accumulation of deposits on the electrodes.

It is also possible to employ alternating currents in the monitoring of oxidation-reduction phenomena, in which case the output of the detector may be observed on the screen of an oscillograph for simultaneous qualitative and quantitative readings.

Figure 18:
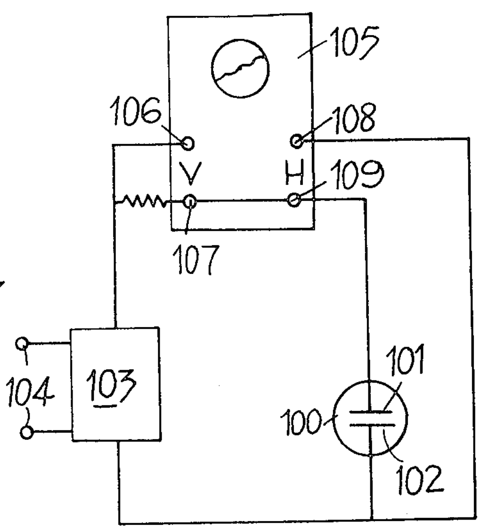
FIG. 18 illustrates diagrammatically the oscillographic monitoring of eluates in accordance with the invention.

This is diagrammatically shown in FIG. 18 in which the detector cell is represented by 100 comprising electrodes 101 and 102. The alternating current generator is diagrammatically shown as 103 having input terminals 104 adapted to be connected to the mains or to a battery. The oscilloscope 105 has terminals 106 and 107 for the vertical component of the oscillogram and terminals 108 and 109 for the horizontal component. It is, of course, possible in principle to provide circuitry for the side by side continuous recording of the vertical and the horizontal component of the signal. Sine wave or square wave alternating current may be employed.

Figure 19:
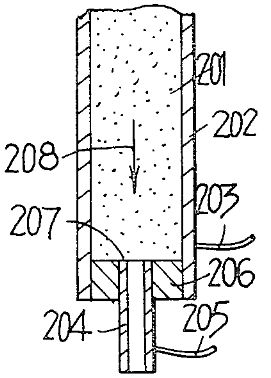
FIGS. 19 to 22 represent in broken away section parts of chromatographic columns equipped with detection and reference electrodes for carrying out the method in accordance with the invention.

Referring to FIG. 19 the column 201 has walls 202 made of stainless steel and, being themselves conductive, serving as the one electrode of the detection system by being provided with a terminal 203. The outlet end of the column is formed by a glassy carbon tube 204 with a terminal 205; the tube, being of somewhat smaller outer diameter than the internal diameter of column walls 202, is held in the end of column walls 202 by an insulating stopper 206 made of polytetrafluoroethylene. The inner end 207 of tube 204 is substantially flush with the inwardly directed end of the stopper 206 and perfectly normal to the direction of flow indicated by arrow 208. Accordingly the plate height contribution of the detector system to the overall plate height of the chromatographic system is completely negligible, there being a sharp change in signal detectable from the very moment there is a change in the eluate entering from the column 201 into the tube 204. The embodiment in accordance with FIG. 19 is, for example, suitable for conductivity monitoring or the observation of current when a voltage is applied to terminals 203 and 205 from an external source of electrical power (direct current or alternating current).

Figure 20:
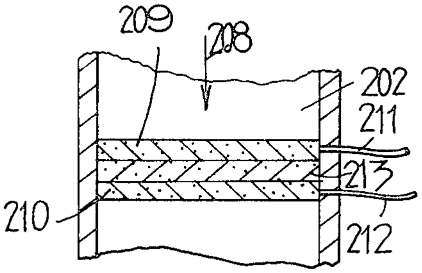

Similar observations may be made with the embodiment in accordance with FIG. 20 which need not necessarily be at the outlet end of the chromatographic column 202 but could be in an intermediate position of a column for observing the progress of the chromatogram at such locality. The pair of electrodes is provided by two porous conductive layers 209 and 210 respectively with terminals 211 and 212 spaced apart by a porous layer 213 of insulating material, e.g. of sintered polytetrafluoroethylene. The layers 209 and 210 may consist, for example, of sintered metal powder, of graphite powder bonded together with a resin binder or of a porous layer of sintered resin powder with a conductive filler, e.g. graphite or metal. This embodiment may also be employed for electrical capacity measurements and for potential or current measurements arising out of the zeta effect.

Figures 21, 22, 23:
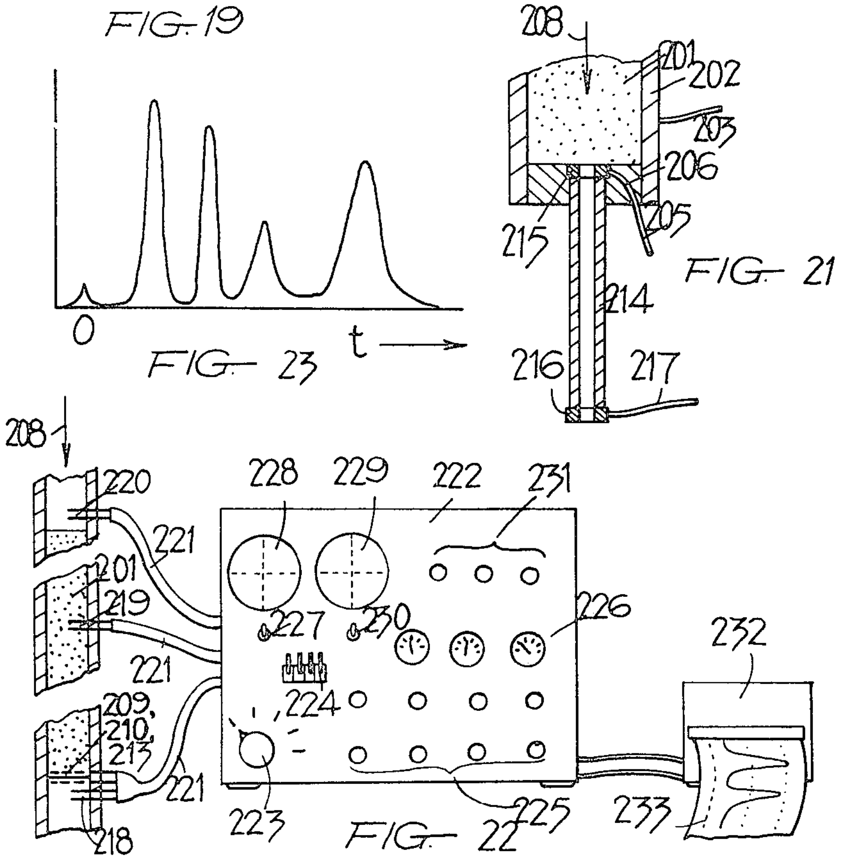
FIG. 23 represents an entire chromatographic apparatus in accordance with the invention diagrammatically partly in elevation, partly in broken away section.

FIG. 21 is similar to FIG. 19 and like parts are denoted by like reference numbers. The tube 204 in this embodiment is replaced by a fine capillary 214 of insulating material having a total volume less than the volume of eluate contained in a section of column 201 having a length equal to the average plate height of the column under its prescribed operating conditions. The two ends of capillary 214 are formed by annular sections 215 and 216 respectively of conductive material, e.g. metal, for example platinum or graphite, preferably glassy carbon. Ring 215 has a terminal 205, whilst ring 216 has a terminal 217. Across terminals 203 and 205 the same measurements may be taken as in the case of terminals 203 and 205 of FIG. 19, whilst the terminal pair 205 and 217 is designed particularly for zeta effect measurements arising along the length of capillary 214.

Referring to FIG. 22 the chromatographic column 201 comprises at its outlet end a set of electrodes 209, 210, 213 as in FIG. 20 and a pair of electrodes 218 having different characteristics, e.g. being of any one of the types described further above. A further electrode pair 219 of any type provided for in accordance with the present invention is located in about the middle of column 201 whilst a pair of compensating electrodes 220 is provided in the inlet end of the column.

The latter may be connected up jointly with any of the other pairs of electrodes in the manner already described in the main patent application.

Cables 221 lead to the monitoring apparatus 222 having a selector switch 223 the setting of which determines the electrical quantity which is to be monitored, for example, conductivity, current resulting from electrolytic oxidation-reduction, capacitance, zeta potential or current, alternating current polarographic data, or any other measurable electrical quantity or combination of quantities superimposed upon one another.

The switches 224 serve for the selection of the electrodes between which the effects are to be monitored and the dials 225 of which any desired or required number may be present, serve to adjust the sensitivity, applied potential or any other settings of the instrument at the option of the operator to produce the desired readings with the particular solutes being investigated and in accordance with the particular range of concentrations in which they are present. To assist with these adjustments there are also provided various gauges 226 including voltmeters, amperemeters and galvanometers.

Switch 227 serves to switch on and off the oscilloscope 228 which is employed when it is desired to observe alternating current polarograms whilst a second oscilloscope 229 with switch 230 serves to monitor the pulse shape of electrical pulses applied to the electrodes by a pulse generator also included in the instrument 222. The frequency, shape and amplitude of such pulses may be controlled by means of dials 231.

The output end of instrument 222 is connected to one or more recording instruments 232 by which the data monitored at the various localities are automatically and continuously recorded on paper 233.

Example 1

Separation of free fatty acids.—The method is suitable for free fatty acids having between 2 and about 24 carbon atoms. The sample solution should contain the fatty acids dissolved in water or aqueous acetone and the acids may be present in concentrations as low as $10^{-5}$ M.

Any one of the afore-described electrode systems may be employed, although for the particular experiment a heavy walled glass tube was used of 1 mm. internal diameter with holes drilled through opposite sides of the glass wall at the outlet end to accommodate two graphite electrodes made of propelling pencil leads with their ends spaced ½ mm. apart and cemented into the glass with epoxy resin. The column packing consisted of deactivated kieselguhr wetted to the extent of 20 weight percent with normal octane as stationary phase. The mobile phase was 65% aqueous acetone $\frac{1}{10}$ normal in respect of potassium chloride and saturated with atmospheric oxygen. The sample introduced was 1 microlitre. A direct current potential of 1.7 volts was applied across the electrodes and the current which flowed was recorded.

FIG. 23 represents the chromatogram recorded with n-hexanoic, n-decanoic, n-tetradecanoic and n-hexadecanoic acid. The entire chromatogram was completed in 20 minutes.

In this example the chromatogram was in fact obtained by an indirect observation of conductivity, since the changes in conductivity determined the rate of oxygen discharge (oxygen dissolved in the mobile phase serving as indicator substance), the resulting current being recorded.

Example 2

Under similar conditions, but using polyamide particles of 20 to 30 micron particle size as a stationary phase and 7:3 aqueous methanol, 0.2 normal in respect of potassium iodide as mobile phase, a mixture of aromatic nitro compounds was chromatographed consisting of paranitrotoluene, para-nitrotoluylbromide and alpha-nitronaphthalene, which in the course of 12 minutes emerged as well-defined peaks in that sequence. The sample size was 3 microlitres, $10^{-4}$ M in respect of the solutes. The applied voltage was 1.7 volts.

Example 3

Pesticides.—The same conditions as in Example 2 were employed to separate DDT, gammexane (the gamma form of benzene hexachloride) and dieldrin which emerged as well-defined peaks in that sequence.

What we claim is:

1. A detection method for monitoring the progress of a chromatogram in a chromatographic system at an observation locality of said system which comprises:
   (i) passing a moving phase of the system in contact with a solid detection electrode at said locality;
   (ii) forming a detection circuit comprising said electrode and a reference electrode;
   (iii) said detection circuit being selectively responsive to the streaming potential or current of said moving phase, or the electrolytic reaction rate of an indicator substance under polarographic conditions whereby said circuit is rendered selectively receptive to a constitution and concentration dependent electrical signal, selected from the group of signals indicative of double layer phenomena and an electric reaction rate of an indicator substance at said locality;
   (iv) observing said signal; and
   (v) monitoring the operation of the chromatographic system with reference to changes in the magnitude of said signal.

2. Method according to claim 1, said detection circuit being selectively responsive to the streaming potential or current of said moving phase.

3. Method according to claim 2 wherein said circuit is rendered selectively receptive to a signal indicative of double layer phenomena and which comprises passing said moving phase at said locality through constricted passage means in an electrically insulating medium, said detection and reference electrode being at opposite ends of said passage means and observing a signal corresponding to the constitution and concentration dependent streaming potential across said passage means.

4. Method according to claim 3 wherein the streaming potential is observed in terms of potential measurements.

5. Method according to claim 3, wherein the streaming potential is observed in terms of the streaming current flowing through an external electrical connection between said electrodes as a result of the streaming potential.

6. Method according to claim 1, said detection circuit being selectively responsive to the electrolytic reaction rate of an indicator substance under polarographic conditions.

7. Method according to claim 1 which comprises rendering said circuit selectively receptive to a signal indicative of an electrolytic reaction rate of an indicator substance which comprises: introducing into said locality a supporting electrolyte and an indicator substance capable of electrolytic reaction at a rate dependent on the concentration and constitution parameters of the moving phase; applying a potential difference across said electrode and observing the current through the circuit as a function of said potential difference.

8. Method according to claim 5, wherein the indicator substance is oxygen.

References Cited

UNITED STATES PATENTS

| | | | |
|---|---|---|---|
| 3,346,479 | 10/1967 | Natelson | 204—301 |
| 3,375,187 | 3/1968 | Buchler | 204—301 |
| 3,384,564 | 5/1968 | Ornstein et al. | 204—180 |

OTHER REFERENCES

Hampel: "Encyc. of Electrochem." (1964), Reinhold Pub. Corp., QD 553 E5 c. 2, pp. 232–236.

Helfferich: "Ion Exchange" (1962), McGraw-Hill, pp. 494–498.

Gilwood: "Ion-Exchange Endpoint," Instruments and Automation, October 1954, p. 1633.

Laskowski et al.: "Dielectric Indicator for Column Chromatography," Analytical Chemistry, vol. 24, No. 6, June 1952, pp. 965–969.

JOHN H. MACK, Primary Examiner

A. C. PRESCOTT, Assistant Examiner

U.S. Cl. X.R.

204—195, 299; 201—1